US012705117B2

(12) United States Patent
Browder et al.

(10) Patent No.: US 12,705,117 B2
(45) Date of Patent: Aug. 11, 2026

(54) SYSTEM AND METHOD FOR GENERATING A NAMESPACE BASED ON A USER PROFILE

(71) Applicant: Signet Health Corporation, North Richland Hills, TX (US)

(72) Inventors: Blake Browder, Dallas, TX (US); Joy Figarsky, Little Rock, AR (US)

(73) Assignee: BH Operations, LLC, North Richland Hills, TX (US)

( * ) Notice: Subject to any disclaimer, the term of this patent is extended or adjusted under 35 U.S.C. 154(b) by 0 days.

(21) Appl. No.: 18/957,676

(22) Filed: Nov. 23, 2024

(65) Prior Publication Data

US 2026/0147643 A1 May 28, 2026

(51) Int. Cl.
*G06F 9/54* (2006.01)
*G06F 9/451* (2018.01)
*G06F 21/31* (2013.01)

(52) U.S. Cl.
CPC .............. *G06F 9/542* (2013.01); *G06F 9/451* (2018.02); *G06F 21/31* (2013.01)

(58) Field of Classification Search
None
See application file for complete search history.

(56) References Cited

U.S. PATENT DOCUMENTS 11,327,932 B2 * 5/2022 Hung .................... G06F 16/214
11,553,000 B2 1/2023 Beredimas et al.
2012/0296670 A1 11/2012 Kapoor
2013/0151300 A1 * 6/2013 Le Chevalier ......... G06Q 50/20 705/7.15
2013/0254205 A1 * 9/2013 Boyle ............... G06F 16/24578 709/204
2015/0120641 A1 * 4/2015 Soon-Shiong ......... G06Q 30/02 706/52
2018/0025114 A1 1/2018 Chaffee
2018/0129803 A1 * 5/2018 Levin ...................... G06F 21/54
2019/0114112 A1 * 4/2019 Lin ..................... G06F 12/0246
2021/0318914 A1 * 10/2021 Moyer ................ G06F 16/2282
2022/0053001 A1 * 2/2022 Shipkovenski ..... H04L 63/0272
2022/0066843 A1 * 3/2022 Gogate ................... G06F 21/31
2022/0075886 A1 * 3/2022 Kasi ...................... G06F 16/164
2022/0321640 A1 * 10/2022 Kulkarni ............... H04L 67/306
2023/0222184 A1 7/2023 Safronoff et al.

FOREIGN PATENT DOCUMENTS

BG 3569 U1 4/2020

* cited by examiner

*Primary Examiner* — Umut Onat
(74) *Attorney, Agent, or Firm* — CALDWELL LLC

(57) ABSTRACT

A system and method for generating a namespace based on a user profile, wherein the system includes at least a processor and a memory communicatively connected to the at least a processor and containing instructions. Wherein the instructions configured the at least the processor to identify a user profile, receive one or more access control lists, generate a namespace as a function of the user profile and the one or more access control lists, generate a namespace as a function of the user profile and the one or more access control lists, wherein generating the namespace includes accessing one or more modules based on the user profile and the one or more access control lists, iteratively updating the one or more access control lists and the user profile using a security parameter and one or more user interactions, and display, at a display device, the one or more modules.

16 Claims, 9 Drawing Sheets

SYSTEM AND METHOD FOR GENERATING A NAMESPACE BASED ON A USER PROFILE

FIELD OF THE INVENTION

The present invention generally relates to the field of user interfaces. In particular, the present invention is directed to systems and methods for generating a namespace based on a user profile.

BACKGROUND

Graphical user interfaces (GUIs) are designed to provide users with a visual means to interact with software applications. GUIs are generally enabled to produce content dynamically, adapting to real-time data changes, user input, or external factors. However, many GUIs often rely on static configurations, meaning that the underlying layout, design elements, and content structures are predetermined and do not change in response to user actions or data fluctuations. The static nature may lead to a dissonance between the information users require or expect and what is actually provided.

SUMMARY OF THE DISCLOSURE

In an aspect, a system for generating a namespace based on a user profile may include at least a processor and a memory communicatively connected to the at least a processor and containing instructions. Wherein the instructions configure the at least a processor to identify a user profile, receive one or more access control lists, generate a namespace as a function of the user profile and the one or more access control lists, wherein generating the namespace includes accessing one or more modules based on the user profile and the one or more access lists, iteratively update the one or more control lists and the user profile using a security parameter and one or more user interactions, and display, at a display device, the one or more modules.

In another aspect, a method for generating a namespace based on a user profile may include identifying a user profile, receiving one or more access control lists, generating a namespace as a function of the user profile and the one or more access control lists, wherein generating a namespace includes accessing one or more modules based on the user profile and the one or more access control lists, iteratively updating the one or more control lists and the user profile using a security parameter and one or more user interactions, displaying, at a display device, the one or more modules.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for generating a namespace based on a user profile. In an embodiment, The current process outlines how a system may manage user access by identifying user profiles, updating access control based on security parameters, and generating accessible modules accordingly. It reflects a dynamic approach to access control and user interfaces, adapting to changes in user roles and/or security conditions.

Aspects of the present disclosure can be used to dynamically manage access control lists. Aspects of the present disclosure can also be used to deliver personalized user interfaces, dynamically updated by access control lists. This is so, at least in part, because The present systems and methods described here within effectively manage access control lists, which provide a framework for the dynamically updated graphical user interfaces.

Aspects of the present disclosure allow for generating a namespace based on a user profile. Exemplary embodiments illustrating aspects of the present disclosure are described below in the context of several specific examples.

Figure 1:
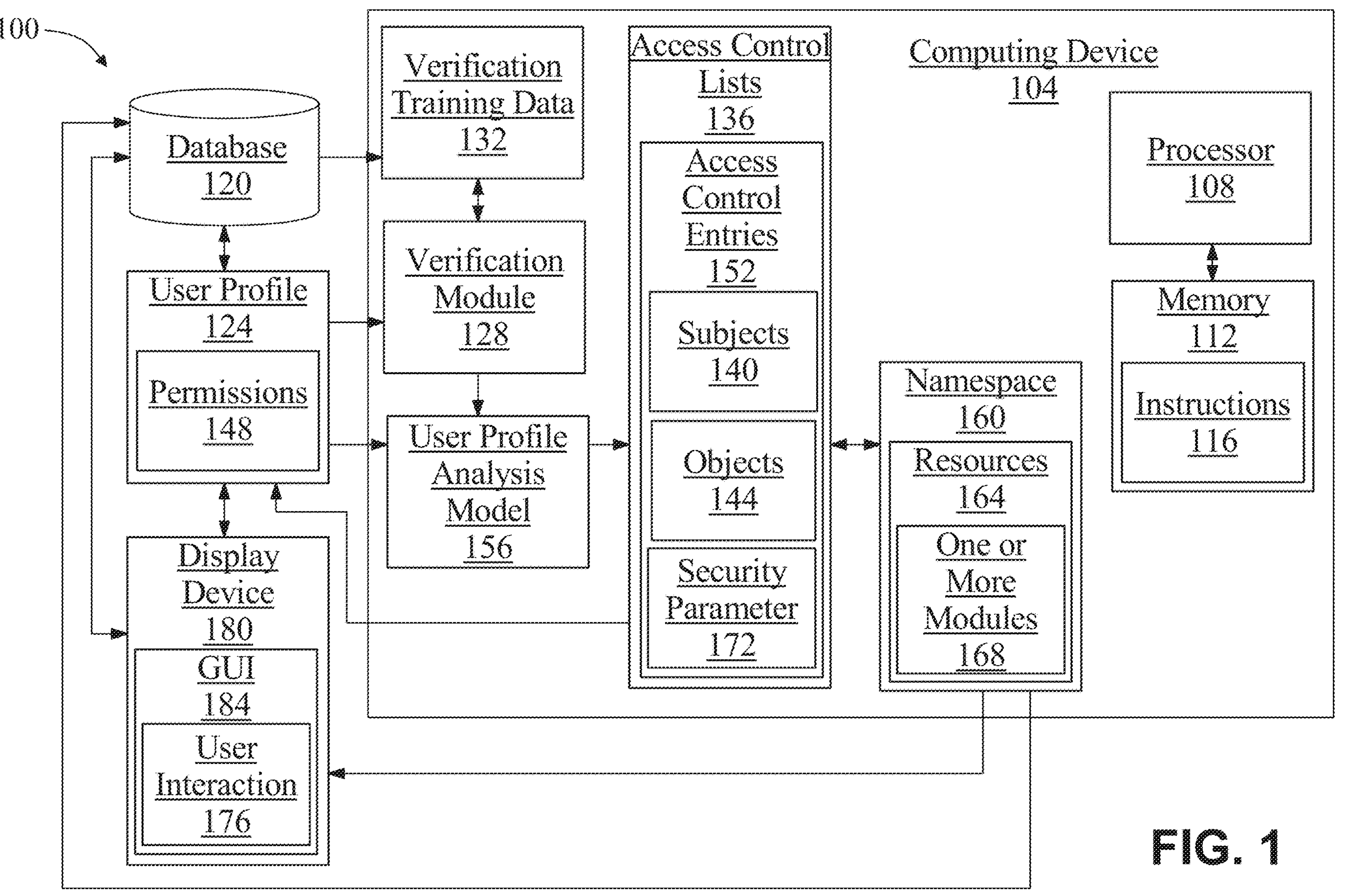
FIG. 1 is a block diagram of a system for determining a prioritized array of associated.

Referring now to FIG. 1, an exemplary embodiment of a system 100 for generating a namespace 160 based on a user profile 124 is illustrated. In an embodiment, system 100 may include at least a processor 108 and a memory 112 communicatively connected to at least a processor 108 and containing instructions 116. Wherein instructions 116 configure at least a processor 108 to identify a user profile 124, receive one or more access control lists 136, generate a namespace 160 as a function of the user profile 124 and the one or more access control lists 136, wherein generating the namespace 160 includes accessing one or more modules 168 based on the user profile 124 and the one or more access control lists 136, iteratively update the one or more access control lists 136 and the user profile 124 using a security parameter 172 and one or more user interactions 176, and display, at a display device 180, the one or more modules 168.

Still referring to FIG. 1, in an embodiment, system 100 includes a computing device 104. Computing device 104 includes a processor 108 communicatively connected to a memory 112. As used in this disclosure, "communicatively connected" means connected by way of a connection, attachment or linkage between two or more relata which allows for reception and/or transmittance of information therebetween.

For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 112 may include a primary memory and a secondary memory. "Primary memory" also known as "random access memory" (RAM) for the purposes of this disclosure is a short-term storage device in which information is processed. In one or more embodiments, during use of the computing device 104, instructions 116 and/or information may be transmitted to primary memory wherein information may be processed. In one or more embodiments, information may only be populated within primary memory while a particular software is running. In one or more embodiments, information within primary memory is wiped and/or removed after the computing device 104 has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor 108. In one or more embodiments, data is transferred from secondary to primary memory wherein processor 108 may access the information from primary memory.

Still referring to FIG. 1, system 100 may include a database 120. The database 120 may include a remote database. The database 120 may be implemented, without limitation, as a relational database, a key-value retrieval database such as a NOSQL database, or any other format or structure for use as database that a person skilled in the art would recognize as suitable upon review of the entirety of this disclosure. The database 120 may alternatively or additionally be implemented using a distributed data storage protocol and/or data structure, such as a distributed hash table or the like. The database 120 may include a plurality of data entries and/or records as described above. Data entries in database 120 may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in database 120 may store, retrieve, organize, and/or reflect data and/or records.

With continued reference to FIG. 1, system 100 may include and/or be communicatively connected to a server, such as but not limited to, a remote server, a cloud server, a network server and the like. In one or more embodiments, the computing device 104 may be configured to transmit one or more processes to be executed by server. In one or more embodiments, server may contain additional and/or increased processor power wherein one or more processes as described below may be performed by server. For example, and without limitation, one or more processes associated with machine learning may be performed by network server, wherein data is transmitted to server, processed and transmitted back to computing device 104. In one or more embodiments, server may be configured to perform one or more processes as described below to allow for increased computational power and/or decreased power usage by the system 100. In one or more embodiments, computing device 104 may transmit processes to server wherein computing device 104 may conserve power or energy.

Further referring to FIG. 1, Computing device 104 may include any computing device as described in this disclosure, including without limitation a microcontroller, microprocessor, digital signal processor (DSP) and/or system on a chip (SoC) as described in this disclosure. Computing device 104 may include, be included in, and/or communicate with a mobile device such as a mobile telephone or smartphone. Computing device 104 may include a single computing device operating independently, or may include two or more computing device operating in concert, in parallel, sequentially or the like; two or more computing devices may be included together in a single computing device or in two or more computing devices. Computing device 104 may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device, which may operate in parallel, in series, redundantly, or in any other manner used for distribution of tasks or memory between computing devices. Computing device 104 may be implemented, as a non-limiting example, using a "shared nothing" architecture.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, in an embodiment, at least a processor 108 is configured to identify a user profile 124. As used throughout this disclosure, "user profile" is a collection of information and attributes that describe a specific user within a system or application. A user profile 124 may contain personal, behavioral, and contextual data that aids system 100 to understand the user's preferences, needs, interactions, and authorization. A user profile 124 may contain personal information, account information, behavioral data, transaction history, social connections, user-generated content, settings and preferences, authorization data, and/or contextual information about a user. In a workspace, including a hospital, contextual information about a user may contain information related to job performance, required expertise, continued learning requirements, and/or the like.

Still referring to FIG. 1, in an embodiment system 100 may identify a user profile 124 through a combination of methods that gather and analyze various types of information about the user. For example, system 100 may utilize user registration and authentication, wherein a user creates an account by providing personal information such as name, email address, and password. Such a process may also include a verification or authentication step; for example, by using email verification and/or two-factor authentication. In some embodiments, user registration and authentication may be initiated by a third party. This may be so in instances, such as a workplace environment, wherein administration sets up a user profile 124 with the intended user's personal information. Once active, the user profile 124 may track the user's use and/or activity. In some embodiments, a user profile 124 may be updated with behavioral data collection, wherein system 100 tracks user interactions 176 with the platform to gather insights about preferences and habits. This may include employing methods such as clickstream analysis, wherein system 100 monitors which pages a user visit and how they navigate the site, and/or time spent, wherein system 100 measures how long a user spends on specific sections and/or features. In some embodiments, system 100 may employ cookies and tracking technologies, including methods of session cookies, wherein system 100 stores information about a user's session to improve their experience during that visit, and/or persistent cookies, wherein system 100 tracks user behavior across multiple sessions for personalized experiences. Further, in some embodiments, system 100 may integrate surveys and/or user feedback forms, wherein users are asked directly for information about their preferences, needs, and/or demographics. In one or more embodiments, system 100 may integrate with third-party services, which may leverage data from external services that users connect to the platform. For example, this may allow system 100 to integrate with one or more external systems, that may enrich a user profile 124 with additional data and/or metadata. Additionally, this may allow a user to maintain login credentials across multiple platforms. In some embodiments, system 100 may integrate machine-learning and analytics to analyze data patterns and predict user preferences and/or behavior. For example, system 100 may utilize a clustering model to group similar users based on their behavior and characteristics to refine profiles. In an embodiment, system 100 may utilize geo-location data, wherein system 100 collects location information to tailor user experience based on geographic context. This may be accomplished through IP address tracking and/or through GPS data. In some embodiments, system 100 may utilize transaction history, wherein system 100 analyzes past transactions or interactions to inform the user profile 124. This may include adapting the user interface of the profile to display frequently visited and/or used features more readily than areas which may be used less frequently. Further, in an embodiment, system 100 may use user segmentation, wherein user segmentation categorizes users into segments based on shared characteristics to simplify profile identification. For example, users may be based on demographics, behavior, and/or groups designated within a user profile 124, such as practice groups within a hospital setting.

With continued reference to FIG. 1, in an embodiment, identifying user profile 124 may include verifying a user profile 124. Verifying a user profile 124 may encompass confirming a user's identity, analyzing a user's permissions 148, and assessing a user's behavioral patterns to ensure that access controls are appropriately enforced. The primary goals of verifying a user profile 124 is to enhance security, minimize risks, comply with regulations, and improve user experience, while, in some embodiments, leveraging machine learning to adapt and evolve the verification process. In an embodiment, verifying user profile 124 may include using a verification module 128, which may include a machine-learning model. Verification module 128 may analyze permissions 148 and one or more security parameters 172 in light of user profile 124. In an embodiment, verification module 128 may be trained in a supervised environment and/or in an unsupervised environment. In an embodiment, wherein verification module 128 is trained in a supervised environment, verification module 128 may be trained using verification training data 132 such as exemplary user profile 124 data, exemplary behavioral data, and/or exemplary transaction data correlated to exemplary historic verification outcomes. If verification module 128 is unable to complete verification a secondary system for authentication may be employed. Training of verification module 128 may occur at computing device 104 and/or remotely. Further, retraining of verification module 128 may occur at computing device 104 and/or remotely. Outputs of verification module 128 may be reiteratively used as new verification training data 132 as they become available.

In further reference to FIG. 1, in an embodiment, at least a processor 108 is configured to receive one or more access control lists 136 (ACLs). As used throughout this disclosure, "access control lists" are a security mechanism used to define permissions 148 and access rights for users or groups to specific resources 164 within a computer system, network, or application. Access control lists 136 may contain subjects 140, objects 144, permissions 148, and access control entries 152 (ACEs). Subjects 140, used here, refer to the users or groups who are granted or denied access to the resources 164. This may include individual user profiles 124, user groups, and/or system processes. Objects 144, used here, refer to the resources 164 and/or items being protected, such as files, directories, databases 120, network devices, or applications. Permissions 148, used here, refer to the specific rights or actions that may be performed on objects 144. For example, and without limitation, permissions 148 may include read permissions 148, write permissions 148, execute permissions 148, and/or delete permissions 148. Read permissions 148 allow a user to view the resource. Write permissions 148 allow a user to modify or create content. Execute permissions 148 allow a user to run executable files or scripts. Delete permissions 148 allow a user to remove the resource. Each ACE 152 in an ACL 136 may define permissions 148 for a specific subject regarding a particular object. For example, ACE 152 may include the subject, and the type of access granted or denied.

With continued reference to FIG. 1, in an embodiment, ACLs 136 may include discretionary ACLs 136 (DACLs), mandatory ACLs 136 (MACLs), and/or network ACLs 136. DACLs may define permissions 148 for each object based on the discretion of the object owner. The owner may grant or deny access to other users. For example, an administrator may grant access to one or more resources 164 for a specific group of user profiles 124. MACLs may be based on a central policy, wherein access rights are assigned based on predefined security levels rather than individual discretion. Network ACLs 136 may be used in network devices like routers and/or firewalls to control traffic based on IP addresses, protocols, and ports. In an embodiment, system 100 may utilize one or a combination of these embodiments to determine access for a user profile 124.

In further reference to FIG. 1, in an embodiment, when a user attempts to access a resource, system 100 may check the corresponding ACL 136 for that resource. System 100 may evaluate the ACL 136 entries to determine if the user has the necessary permissions 148 to perform the requested action. If a matching ACE 152 is found, the access is either granted or denied based on the permissions 148 specified. Utilizing ACLs 136 provides security, granular control, and accountability.

Still referring to FIG. 1, in an embodiment, ACLs 136 may be generated through various methods. For example, ACLs 136 may be generated through manual configuration, role-based access control (RBAC), attribute-based access control (ABAC), automated tools, templates and policies, audit and review, and/or dynamic ACLs 136. One or a combination of these methods may be used to produce ACLs 136 within system 100. Manual configuration may allow administrators to manually create ACLs 136 by specifying permissions 148 for users or groups on particular resources 164. An RBAC configuration may generate ACLs 136 based on user attributes, resource attributes, and environmental conditions. In such an embodiment, policies may define what actions are allowed based on these attributes, offering fine-grained control. As used here, "user attributes" are characteristics or properties of the user requesting access. For example, this may include a user's role, department, security clearance, and/or location. "Resource attributes," refers to characteristics of the resources 164 being accessed. For example, this may include resource type, sensitivity level, owner, and/or creation data. As used here, "environmental conditions" are contextual factors that may affect access decisions, often dynamic in nature. For example, this may include time of access, location of access, device used, and/or current threat level. An automated tool configuration may utilize automated tools to analyze existing permissions 148 and generate ACLs 136 based on best practices or compliance requirements. These tools may also help to identify and remove redundant or conflicting permissions 148. A template and policies configuration may define access scenarios based on standard templates or policies, which may be adapted to create specific ACLs 136 for different resources 164 and/or projects. Employing an audit and review configuration can help to identify required changes to ACLs 136. By analyzing usage patterns and access logs, administrators may generate ACLs 136 that reflect actual needs. In a dynamic ACL 136 configuration, ACLs 136 may be generated dynamically based on user behavior and/or context, allowing for adaptive security measures.

In further reference to FIG. 1, in an embodiment, a dynamic ACL 136 configuration may utilize a user profile analysis model 156. In an embodiment, user profile analysis model 156 may generate one or more ACLs 136 using feature extraction and clustering algorithms. Feature extraction may also be referred to as feature learning. In an embodiment, user profile analysis model 156 mat be trained using exemplary user profiles 124 and exemplary permissions 148 correlated with exemplary one or more ACLs 136. In some embodiments, training may be unsupervised.

Continuing to reference FIG. 1, in an embodiment, user profile analysis model 156 plays a crucial role in determining access permissions based on user behavior s and/or characteristics. As discussed above, this process may include several components, including feature extraction, clustering, and ACL 136 generation. Feature extraction, or feature learning may include identifying and selecting relevant characteristics (features) from user data that may be used to inform access control decisions. For example, in some embodiments, this process may include user interaction data, user attributes, and/or contextual information. User interaction data may include data collected about how users interact with system 100. For example, this may include frequency of access, types of resources accessed, and/or patterns in usage. User attributes may include attributes such as demographic information, role information, and/or behavioral attributes, for example, job title, department, and/or previous permissions. Further, contextual information may include incorporating contextual elements such as time of access, location, and device type into user profile 124. Each of these features may be derived from exemplary user profiles 124. Once system 100 has extracted relevant features, clustering algorithms may be applied to group similar user profiles based on these features. In an embodiment, each cluster may represent different types of users or access needs within the organization. For example, and without limitation, cluster A may include regular users with standard access needs (e.g., view-only permissions), cluster B may include power users requiring additional permissions (e.g., edit or delete capabilities), and cluster C may include users in sensitive roles needing stringent access controls (e.g. finance or HR roles). In some embodiments, clusters may cluster user profiles 124 based on team or department affiliation, and in some embodiments, even further into a hierarchy of levels within a team and/or department. In an embodiment, the output from the clustering process may directly inform the generation of ACLs 136. In an embodiment, generating and maintaining ACLs 136 may include cluster association, wherein each cluster is identified by the clustering algorithm and associated with specific ACLs 136. For instance, all users in cluster A may automatically be assigned to an ACL 136 that grants read-only access to certain resources, while cluster B might have an ACL 136 that includes write access. Further, generating and maintaining ACLs 136 may include dynamic updates, wherein the dynamic nature of system 100 allows for real-time updates to ACLs 136 based on changes in user profiles 124 and/or behaviors. For example, if a user's behavior shifts, or they are removed from a team and placed on another team, they may be re-clustered into a different group, triggering an update to their ACL 136. In one or more embodiments, generating and maintaining ACLs 136 may include a feedback loop, wherein the model is continuously refined using new data. For example, as users interact with system 100, their actions may be fed back into user profile analysis model 156. This ongoing learning process may help adjust clusters and ACLs 136 to better reflect current access needs and behaviors. Further, in some embodiments, profile analysis model 156 may utilize a correlation between exemplary permissions 148, such as historical permissions linked to specific roles or behaviors, and ACLs 136 to enhance decision-making. This correlation ensures that ACLs 136 generated are not only based on static roles, but are dynamically informed by the actual usage patterns of users.

Still referring to FIG. 1, a "feature learning algorithm," as used herein, is a machine-learning algorithm that identifies associations between elements of data in a data set, which may include without limitation a training data set, where particular outputs and/or inputs are not specified. For instance, and without limitation, a feature learning algorithm may detect co-occurrences of elements of data, as defined above, with each other. As a non-limiting example, feature learning algorithm may detect co-occurrences of elements, as defined above, with each other. Computing device 104 may perform a feature learning algorithm by dividing elements or sets of data into various sub-combinations of such data to create new elements of data, and evaluate which elements of data tend to co-occur with which other elements. In an embodiment, first feature learning algorithm may perform clustering of data.

Continuing to refer to FIG. 1, a feature learning and/or clustering algorithm may be implemented, as a non-limiting example, using a k-means clustering algorithm. A "k-means clustering algorithm" as used in this disclosure, includes cluster analysis that partitions n observations or unclassified cluster data entries into k clusters in which each observation or unclassified cluster data entry belongs to the cluster with the nearest mean. "Cluster analysis" as used in this disclosure, includes grouping a set of observations or data entries in way that observations or data entries in the same group or cluster are more similar to each other than to those in other groups or clusters. Cluster analysis may be performed by various cluster models that include connectivity models such as hierarchical clustering, centroid models such as k-means, distribution models such as multivariate normal distribution, density models such as density-based spatial clustering of applications with nose (DBSCAN) and ordering points to identify the clustering structure (OPTICS), subspace models such as biclustering, group models, graph-based models such as a clique, signed graph models, neural models, and the like. Cluster analysis may include hard clustering whereby each observation or unclassified cluster data entry belongs to a cluster or not. Cluster analysis may include soft clustering or fuzzy clustering whereby each observation or unclassified cluster data entry belongs to each cluster to a certain degree such as for example a likelihood of belonging to a cluster; for instance, and without limitation, a fuzzy clustering algorithm may be used to identify clustering of elements of a first type or category with elements of a second type or category, and vice versa. Cluster analysis may include strict partitioning clustering whereby each observation or unclassified cluster data entry belongs to exactly one cluster. Cluster analysis may include strict partitioning clustering with outliers whereby observations or unclassified cluster data entries may belong to no cluster and may be considered outliers. Cluster analysis may include overlapping clustering whereby observations or unclassified cluster data entries may belong to more than one cluster. Cluster analysis may include hierarchical clustering whereby observations or unclassified cluster data entries that belong to a child cluster also belong to a parent cluster.

With continued reference to FIG. 1, computing device 104 may generate a k-means clustering algorithm receiving unclassified data and outputs a definite number of classified data entry clusters wherein the data entry clusters each contain cluster data entries. K-means algorithm may select a specific number of groups or clusters to output, identified by a variable "k." Generating a k-means clustering algorithm includes assigning inputs containing unclassified data to a "k-group" or "k-cluster" based on feature similarity. Centroids of k-groups or k-clusters may be utilized to generate classified data entry cluster. K-means clustering algorithm may select and/or be provided "k" variable by calculating k-means clustering algorithm for a range of k values and comparing results. K-means clustering algorithm may compare results across different values of k as the mean distance between cluster data entries and cluster centroid. K-means clustering algorithm may calculate mean distance to a centroid as a function of k value, and the location of where the rate of decrease starts to sharply shift, this may be utilized to select a k value. Centroids of k-groups or k-cluster include a collection of feature values which are utilized to classify data entry clusters containing cluster data entries. K-means clustering algorithm may act to identify clusters of closely related data, which may be provided with user cohort labels; this may, for instance, generate an initial set of user cohort labels from an initial set of data, and may also, upon subsequent iterations, identify new clusters to be provided new labels, to which additional data may be classified, or to which previously used data may be reclassified.

With continued reference to FIG. 1, generating a k-means clustering algorithm may include generating initial estimates for k centroids which may be randomly generated or randomly selected from unclassified data input. K centroids may be utilized to define one or more clusters. K-means clustering algorithm may assign unclassified data to one or more k-centroids based on the squared Euclidean distance by first performing a data assigned step of unclassified data. K-means clustering algorithm may assign unclassified data to its nearest centroid based on the collection of centroids $c_i$ of centroids in set C. Unclassified data may be assigned to a cluster based on $argmin_{ci \ni c}$ dist(ci, x)$^2$, where argmin includes argument of the minimum, ci includes a collection of centroids in a set C, and dist includes standard Euclidean distance. K-means clustering module may then recompute centroids by taking mean of all cluster data entries assigned to a centroid's cluster. This may be calculated based on ci=1/|Σxi ∋ Si$^{xi}$. K-means clustering algorithm may continue to repeat these calculations until a stopping criterion has been satisfied such as when cluster data entries do not change clusters, the sum of the distances have been minimized, and/or some maximum number of iterations has been reached.

Still referring to FIG. 1, k-means clustering algorithm may be configured to calculate a degree of similarity index value. A "degree of similarity index value" as used in this disclosure, includes a distance measurement indicating a measurement between each data entry cluster generated by k-means clustering algorithm and a selected element. Degree of similarity index value may indicate how close a particular combination of elements is to being classified by k-means algorithm to a particular cluster. K-means clustering algorithm may evaluate the distances of the combination of elements to the k-number of clusters output by k-means clustering algorithm. Short distances between an element of data and a cluster may indicate a higher degree of similarity between the element of data and a particular cluster. Longer distances between an element and a cluster may indicate a lower degree of similarity between a elements to be compared and/or clustered and a particular cluster.

With continued reference to FIG. 1, k-means clustering algorithm selects a classified data entry cluster as a function of the degree of similarity index value. In an embodiment, k-means clustering algorithm may select a classified data entry cluster with the smallest degree of similarity index value indicating a high degree of similarity between an element and the data entry cluster. Alternatively or additionally k-means clustering algorithm may select a plurality of clusters having low degree of similarity index values to elements to be compared and/or clustered thereto, indicative of greater degrees of similarity. Degree of similarity index values may be compared to a threshold number indicating a minimal degree of relatedness suitable for inclusion of a set of element data in a cluster, where degree of similarity indices a-n falling under the threshold number may be included as indicative of high degrees of relatedness. The above-described illustration of feature learning using k-means clustering is included for illustrative purposes only, and should not be construed as limiting potential implementation of feature learning algorithms; persons skilled in the art, upon reviewing the entirety of this disclosure, will be aware of various additional or alternative feature learning approaches that may be used consistently with this disclosure.

Continuing to reference FIG. 1, in an embodiment, at least a processor 108 is configured to generate a namespace 160 as a function of the user profile 124 and the one or more access control lists 136, wherein generating the namespace 160 includes accessing one or more modules 168 based on the user profile 124 and the one or more access control lists. As used throughout this disclosure, "namespace" is a container that holds a set of resources 164, allowing for modularization of code. As used herein, "resource" refers to any material, document, or tool that facilitates a specific goal. For example, resources 164 may include any material, document, and/or tool that facilitates learning, education, or knowledge acquisition, such as training modules, wherein a user may undergo a training. In an embodiment, resources 164 within namespace 160 may be categorized and/or grouped based on their ACLs 136. For example, directories may be structured such that only certain users or groups may see specific subdirectories and/or files based on their access rights. In some embodiments, namespace 160 may dynamically adjust its visibility based on the access rights defined in ACLs 136. For example, when a user queries the namespace 160, system 100 may only present resources 164 to which the user has access, effectively filtering the namespace 160 based on ACLs 136. In an embodiment, namespace 160 may include a hierarchical namespace 160. In such an embodiment, each level of namespace 160 may have its own ACLs 136. For example, and without limitation a top-level directory may grant access to a group of users, whereas subdirectories may further refine access rights, allowing only certain users to access specific resources 164. In some embodiments, namespace 160 may include an access-based namespace 160 generation, wherein system 100 iterates through the resources 164 and their ACLs 136, creating a structure where resources 164 with similar access rights are grouped together and users may be shown a customized view of the namespace 160 that reflects their permissions 148 and the security parameters 172 associated with their user profile 124. Further, ACLs 136 may be used to generate reports on the namespaces 160, showing which resources 164 are accessible to which users or groups. This may aid in understanding permissions 148 and potential security risks. When a user logs in, system 100 may check their ACLs 136 and generate a namespace 160 view that only includes paths to which they have access.

With further reference to FIG. 1, in an embodiment, resources 164 may include one or more modules 168. As used here, "one or more modules" refers to distinct units or components of an online course or educational program that focus on a specific topic, skill, or learning objective. Each module may be designed to be self-contained, allowing learners to engage with and absorb the material independently. One or more modules 168 may include interactive components and/or assessment components, such as quizzes, simulations, discussions, assignments, and/or multimedia resources (videos, animations, etc.) to enhance engagement and learning retention. In an embodiment, one or more modules 168 may include progress tracking. For example, learning management systems (LMS) may track learners' progress through modules, allowing them to see completed sections and remaining content. A collection of one or more modules 168 may be referenced as a course. In an embodiment, system 100 may generate a customized course based on a user profile 124, wherein the one or more modules 168 accessed within namespace 160 are particularized based on a user profile 124.

In continued reference to FIG. 1, in an embodiment, one or more modules 168 may be accessed based on user profile 124, specifically, one or more modules 168 may be accessed based on certifications, job titles, experience levels, and/or point of care associated with user profile 124. Experience level may indicate a level of access as well as including any practice data, such as incident reports and/or the like. Incident reports may indicate the need for additional training in an area associated with the incident. This may implicate one or more modules 168 in namespace 160 that may be accessed based on said incident report. "Point of care," as used throughout this disclosure refers to the context or location in which a medical professional treats a patient. For example, and without limitation, this may include emergency departments, patient wards, outpatient clinics, and/or home healthcare. Additionally, this may include underlying contexts such as geographical location. For example, treatment may be provided in rural areas and/or city environments. Each of these attributes may indicate different appropriate modules that may be accessed within a namespace 160.

In further reference to FIG. 1, in an embodiment, the one or more modules 168 may be accessed based on a user profile 124 and the one or more ACLs 136. In some instances, one or more modules 168 may be received from a database 120. Database 120 may be local and/or global.

With continued reference to FIG. 1, in an embodiment, at least a processor 108 is configured to iteratively update one or more ACLs 136 and the user profile 124 using a security parameter 172 and one or more user interactions 176. A "security parameter" refers to the broader criteria or attributes used to determine access control rules within an ACL. Security parameters 172 may include factors such as user roles, resources 164 sensitivity, environmental conditions, time-based restrictions, and/or user attributes. In an embodiment, ACLs 136 may be updated based on changes to user profile 124 as a function of one or more security parameters 172. This may be accomplished using user profile 124 analysis model, wherein user profile 124 analysis model maintains dynamic ACLs 136 by iteratively updating ACLs 136 based on changes to user profile 124. This may ultimately update user profile 124 permissions 148 for one or more modules 168 based on the updated ACLs 136. Additionally, user profile 124 may be updated based on one or more user interactions 176, wherein the one or more user interactions 176 indicates a change to user profile 124 and ultimately a change in security parameter 172, causing an update in the one or more ACLs 136. A "user interaction" refers to the ways in which users engage with a system, application, and/or interface. In an embodiment, user interactions 176 may include all methods through which users input data, receive feedback, and/or navigate through the digital environment. For example, user interaction 176 may include progress on one or more modules 168.

Still referring to FIG. 1, in an embodiment, at least a processor 108 may be configured to display one or more modules 168 at a display device 180. In an embodiment, display device 180 may utilize a graphical user interface 184 (GUI), wherein the GUI 184 iteratively updates based on one or more user interactions 176. A "display device" refers to an electronic device that visually presents information to the entity. In some cases, display device 180 may be configured to project or show visual content generated by computers, video devices, or other electronic mechanisms. In some cases, display device 180 may include a liquid crystal display (LCD), a cathode ray tube (CRT), a plasma display, a light emitting diode (LED) display, and any combinations thereof. In a non-limiting example, one or more display devices 180 may vary in size, resolution, technology, and functionality. Display device 180 may be able to show any data elements and/or visual elements in various formats such as, textural, graphical, video among others, in either monochrome or color. Display device 180 may include, but is not limited to, a smartphone, tablet, laptop, monitor, tablet, and the like. Display device 180 may include a separate device that includes a transparent screen configured to display computer generated images and/or information. In some cases, display device 180 may be configured to present a GUI 184 to a user, wherein a user may interact with the GUI 184. In some cases, a user may view a GUI 184 through display. Additionally, or alternatively, processor 108 may be connected to display device 180. In some embodiments, GUI 184 may be updated based on user inputs and the plurality of datasets. A "GUI," is a type of user interface that allows users to interact with electronic devices, software applications, or operating systems through graphical elements rather than text-based commands. GUIs 184 may used visual indicators, such as windows, icons, buttons, and menus, to facilitate user interaction 176. For example, and without limitation GUI 184 may include visual elements, point-and-click interactions, windows and dialogs, consistency, feedback mechanisms, and/or the like.

A "GUI" is a visual interface that allows users to interact with electronic devices through graphical elements rather than text-based commands. Features of a GUI 184 may include, but are not limited to windows, icons, menus, buttons, sliders and controls, and/or any other graphical content configured to assist a user in interacting with an electronic device. As used in this context, "manipulation" refers to actions or interactions a user may perform to modify, control, or navigate through an interface. Such manipulations may require the use of input devices such as, but not limited to mouses, keyboards, and/or touchscreens. For example, manipulations may include clicking, dragging, scrolling, resizing, zooming, hovering, right-clicking, keyboard shortcuts, inputting data, removing data, and/or modifying data.

In continued reference to FIG. 1, in an embodiment, GUI 184 may include one or more event handlers. As used throughout this disclosure, "event handler" refers to functions or methods designed to respond to specific events in a program, particularly in user interface contexts. An "event" is an occurrence that is detected by the program. For example, this may include a mouse click, keyboard input, and/or a change in a form field. In an embodiment, event handlers may include a listener and or binding process. A listener is a function that listens for specific events on an element. For instance, a button or an input field. A binding process is the process of associating an event with its handler. When an event occurs, an event object may be passed to the handler, containing details about the event. Event handlers allow for interactivity, modularity, and reusability. In such that, event handlers enable applications to respond dynamically to user actions, organize code by separating event handling logic from other program logic, and the same handler may be used for multiple elements and/or events. Further, in an embodiment, the feedback from an event handler may be utilized as training data in the training or retraining of models and/or modules as described here within.

With continued reference to FIG. 1, in an embodiment, user interactions 176 may include structured and interactive user inputs. As used here, "structured user input" refers to inputs that are predefined and organized forms of data that users enter into a system. These inputs may follow a specific format and/or a set of rules. "Interactive user inputs" refer to inputs that allow users to engage with the system in a flexible manner. These inputs may involve real-time feedback and may adapt based on user actions. In an exemplary embodiment, iteratively updating the GUI 184 based on one or more user interactions 176 may include one or more interactions 176 including a user submitting an assignment, wherein the user selects a course, navigates to the "assignments" section, and uploads a file for a specific assignment, and clicks "submit," at least a processor 108 validates the file type and size, then saves the submission to a database 120, and the GUI 184 updated the display device base don the user interaction, wherein updating GUI 184 includes a change in the course progress status.

Figure 2A:
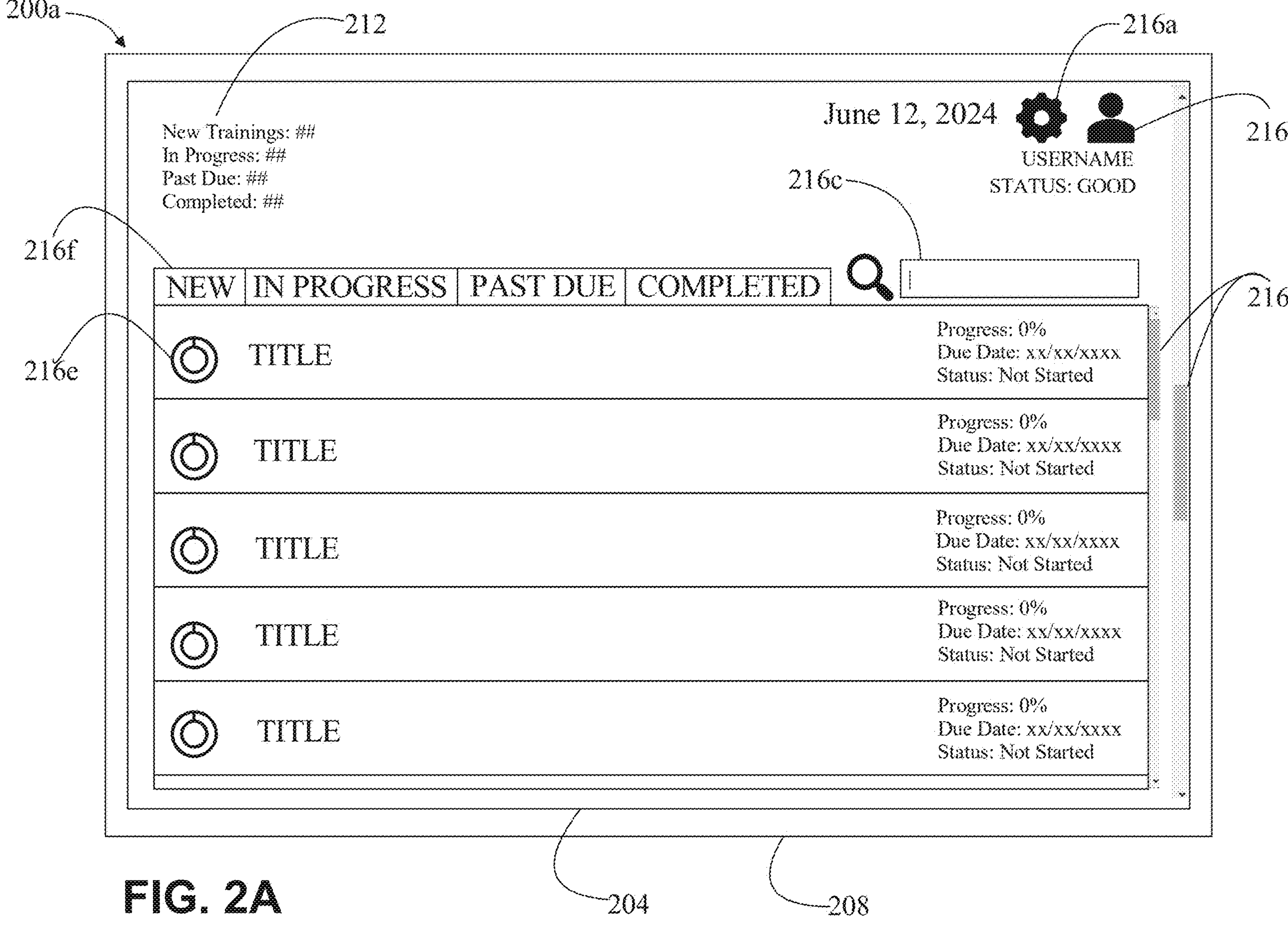
FIG. 2A is an illustration of an exemplary graphical user interface.

Now referring to FIG. 2A, an illustration 200*a* of an exemplary graphical user interface is shown. In an embodiment, GUI may be displayed using a downstream device 208. In an embodiment, the graphical user interface 204 may include at least a visual element 212. In an embodiment, the visual element 212 may include an interactive element 216 and/or various textual descriptions as referenced in the illustration. In an embodiment the interactive element 216 may allow a user to engage directly with the graphical user interface 204 through a variety of actions.

In an embodiment, the interactive element 216 may include settings gear 216*a*, profile icon 216*b*, find icon 216*c*, scroll bar icon 216*d*, progress icon 216*e*, one or more tabs 216 *f*, and/or the like. In other embodiments, interactive element 216 may include a sorting icon, a folder icon, a new task icon, an edit icon, a check box icon In an embodiment, the interactive element 216 may include a settings gear 216*a*. In an embodiment, the settings gear 216*a* may enable users to access the system or application settings where they may modify preferences and configurations. Without limitation, by clicking on the settings gear 216*a*, users may adjust features like notifications, display options, account details, and the like. In an embodiment, the settings gear 216*a* may represent control over personalizing the environment within the application. In an embodiment, the settings gear 216*a* may ensure that users can customize their experience to meet their specific needs.

In an embodiment, the interactive element 216 may include a profile icon 216*b*, which may allow users to access their personal profile settings. In an embodiment, the profile icon 216*b* may link to a page where users may view and edit their personal information, such as their name, contact details, or profile picture. In an embodiment, the profile icon 216*b* may make it simple for users to manage their account and view related data quickly. In an embodiment, the profile icon 216*b* may be placed in a convenient location, allowing easy access to account settings. In an embodiment, the profile icon 216*b* may help users maintain control over their profile, ensuring that their information stays up-to-date.

In an embodiment, the interactive element 216 may include a find icon 216*c*, which may function as a search tool for locating specific information within the application. In an embodiment, the find icon 216*c* may allow users to quickly search through data, files, or content to pinpoint exactly what they need. In an embodiment, the find icon 216*c* may be especially useful in applications that manage large volumes of information or files. In an embodiment, the find icon 216*c* may enhance efficiency by reducing the time spent manually browsing through content. Continuing, by providing a fast search function, users may access information more quickly and effectively.

In an embodiment, the interactive element 216 may include a scroll bar icon 216*d*, which may provide users with the ability to navigate through long pages of content. In an embodiment, the scroll bar icon 216*d* may be essential when the content exceeds the available screen space, allowing users to scroll vertically or horizontally. In an embodiment, the scroll bar icon 216*d* may help users move through information at their own pace, ensuring they can access all relevant content. In an embodiment, the scroll bar icon 216*d* may be particularly useful in applications with extensive data, such as documents or databases. In an embodiment, the scroll bar icon 216*d* may enhance the user interface by making navigation simple and intuitive.

In an embodiment, interactive element 216 may include progress icon 216*e*. In an embodiment, the progress icon 216*e* may be used to visually represent the progress of a task, such as completion of a process within the application. In an embodiment, the progress circle 216*e* may gradually fill or rotate as the task advances, providing users with real-time feedback on the status of their actions. In an embodiment, the progress circle 216*e* may help users gauge how much time remains for a task or process, reducing uncertainty and improving the overall usability of the system. In an embodiment, the progress circle 216*e* may be a helpful tool for keeping users informed and engaged.

In an embodiment, interactive element 216 may include one or more tabs 216*f*. For example, and without limitation one or more tabs 216*f* may include a "new" tab, a "in progress" tab, a "past duc" tab, and/or a "completed" tab. A user may click into each tab and the window below one or more tabs 216*f* will populate with related data. The orientation of tabs may allow a user to maintain organization and allow for lower processing times due to a smaller volume of related data associated with each tab.

In an embodiment, the interactive element 216 may include a text or numerical description, which may provide additional information or context about a specific icon or feature. In an embodiment, the text or numerical descriptions may help users understand the purpose of a listed item, making the interface more user-friendly. In an embodiment, the text or numerical description may be displayed when a user hovers over an icon, providing clarification without cluttering the interface. In an embodiment, the text or numerical description may improve the usability of the system, particularly for new or unfamiliar users. Additionally, in an embodiment a user may click on text or numerical description, which may provide a window with additional notes or comments.

Figure 2B:
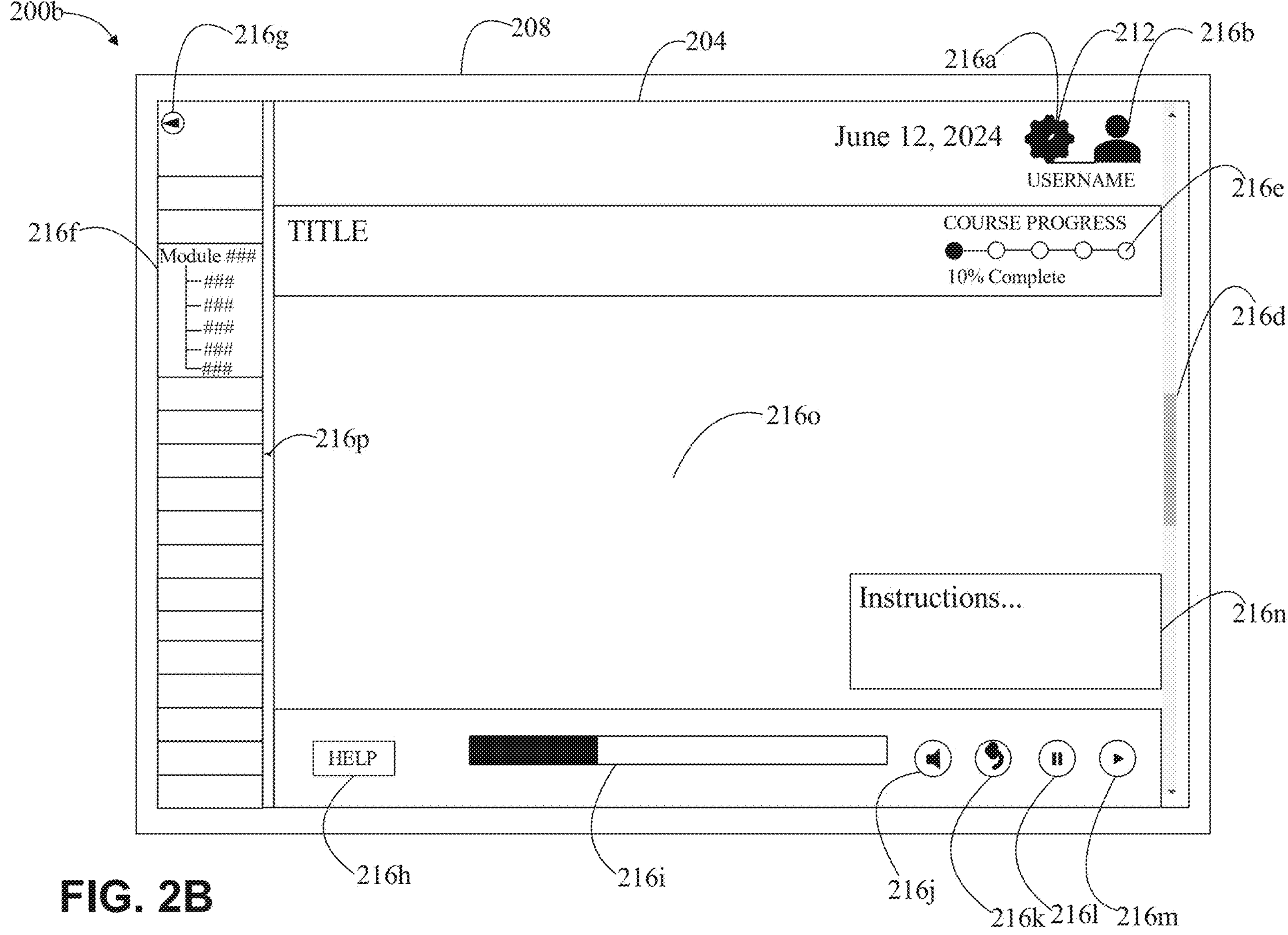
FIG. 2B is an illustration of a modified exemplary graphical user interface.

Now referring to FIG. 2B, an illustration 200*b* of an exemplary modified graphical user interface is shown. One or more tabs 216*f* may indicate the presence of multiple modules and/or trainings. In an embodiment, interactive element 216 may include back button 216*g*. In an embodiment, back button 216 may allow a user to click back button 216 and return to the home screen.

With continued reference to FIG. 2B, in an embodiment, interactive element 216 may include help icon 216*h*. In an embodiment, help icon 216*h* may allow a user to click help icon 216*h*, which may allow a pop-up window to appear. In some embodiments, the pop-up window may initiate a chat bot. In other embodiments, help icon 216*h* may put user in contact with a help desk. Further, in some embodiments, help icon 216*h* may provide written instructions to assist a user.

Still referring to FIG. 2B, in an embodiment, interactive element 216 may include slide/audio progress 216*i*. In an embodiment, slide/audio progress 216*i* may allow a user to view where they are in a video in real time. Further, in an embodiment, slide/audio progress 216*i* may allow a user to move about a video or slide, but clicking about slide/audio progress 216*i*.

In further reference to FIG. 2B, in an embodiment, interactive element 216 may include audio icon 216*j*. In an embodiment, audio icon 216*j* may allow a user to interact with audio that is a part of the module. For example, user may click audio icon 216*j* and a small box may appear, wherein the box may include audio adjustment tools. In such an embodiment, user may adjust audio for volume, speed, and/or for closed captioning.

With further reference to FIG. 2B, in an embodiment, interactive element 216 may include replay/rewind icon 216*k*. In an embodiment, replay/rewind icon 216*k* may allow a user to go back in a video. In some embodiments, replay/rewind icon 216*k* may restart the entire video or slides.

Still referring to FIG. 2B, in an embodiment, interactive element 216 may include pause icon 216*l*. In an embodiment, pause icon 216*l* may allow a user to pause the module. This may include pausing a video and/or pausing a slide, or audio. In an embodiment, pause icon 216*l* may pause the module and bring user to another window, blocking user's view of content area 2160 until a user resumes module. In an embodiment, a user may resume or play module using play icon 216*m*.

In continued reference to FIG. 2B, in an embodiment, interactive element 216 may include instructions 216*n*. In an embodiment, instructions 216*n* may include written or audio instructions. A user may click through instructions 216*n* as they complete the module. Instructions 216*n* may be a part of content area 2160 and/or they may be separate, based on the content appearing in content window 2160. In an embodiment, interactive element 216 may include content window 2160, wherein content of the module appears and may be interacted with by a user. For example, content window may include audio and/or visual data. Further, content window may present slides, videos, quizzes, and/or other interactive activities.

In an embodiment, the interactive element 216 may include a drop down carrot 216*p*. In an embodiment, the drop down carrot 216*p* may indicate the presence of a collapsible or expandable menu, allowing users to click on it to reveal additional options or settings. In an embodiment, the drop down carrot 216*p* may be placed beside menu items or sections where further choices or configurations are available. In an embodiment, the drop down carrot 216*p* may provide users with a way to hide or display extra content. In an embodiment, the drop down carrot 216*p* may contribute to a cleaner, more organized interface. In an embodiment, the drop down carrot 216*p* may assist in managing space on the screen, ensuring that users only see relevant information when needed.

Figure 3:
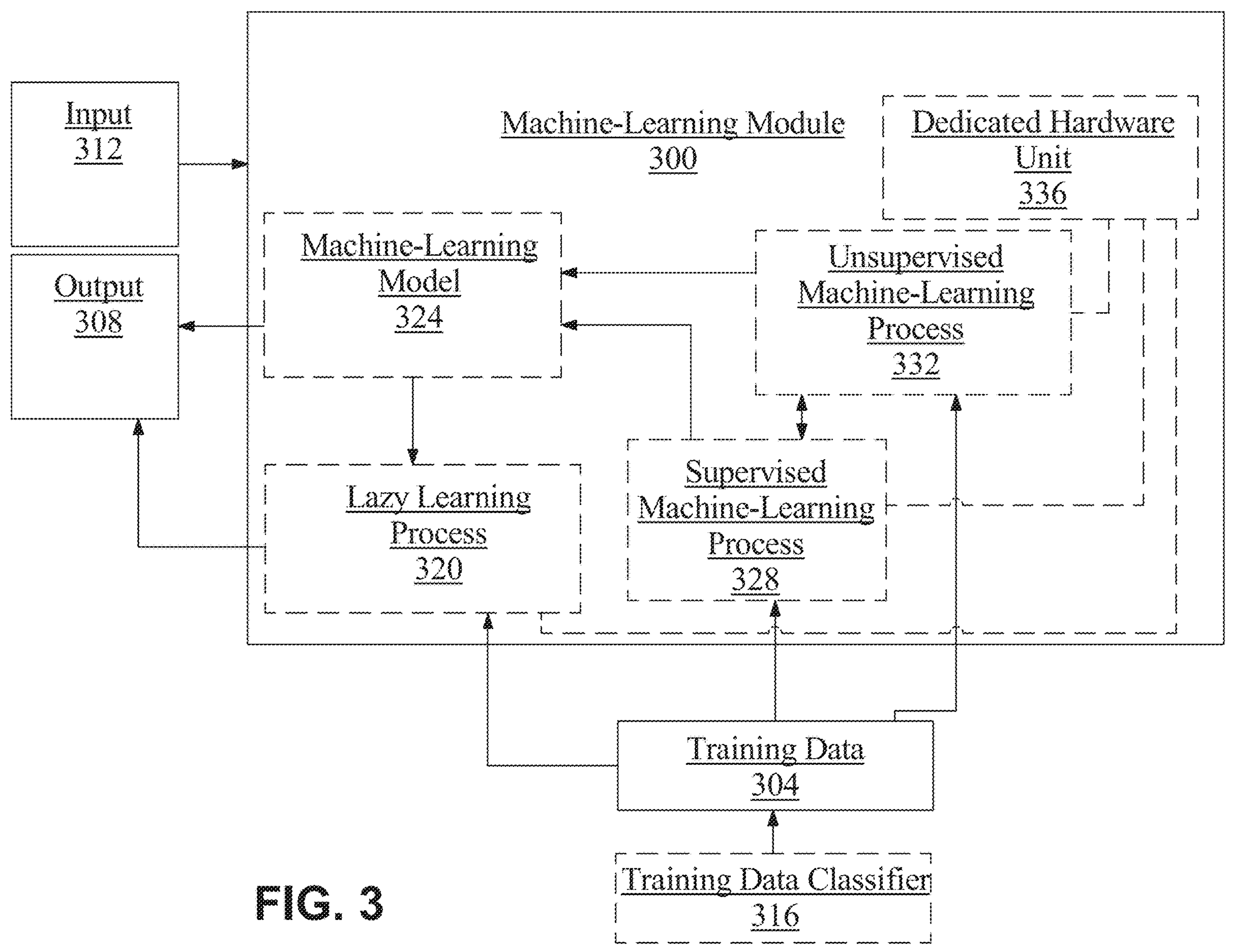
FIG. 3 is a block diagram of an exemplary machine-learning process.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript JAVASCRIPT™ Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to characterize sub-populations associated with security parameters.

Still referring to FIG. 3, a computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)=P(B), where P(A/B) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Computing device may then calculate a likelihood table by calculating probabilities of different data entries and classification labels. A computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, a computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute $l$ as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. A computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 3, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 3, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}: X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 3, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include inputs as described above as inputs, outputs described above as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic “1” and “0” voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
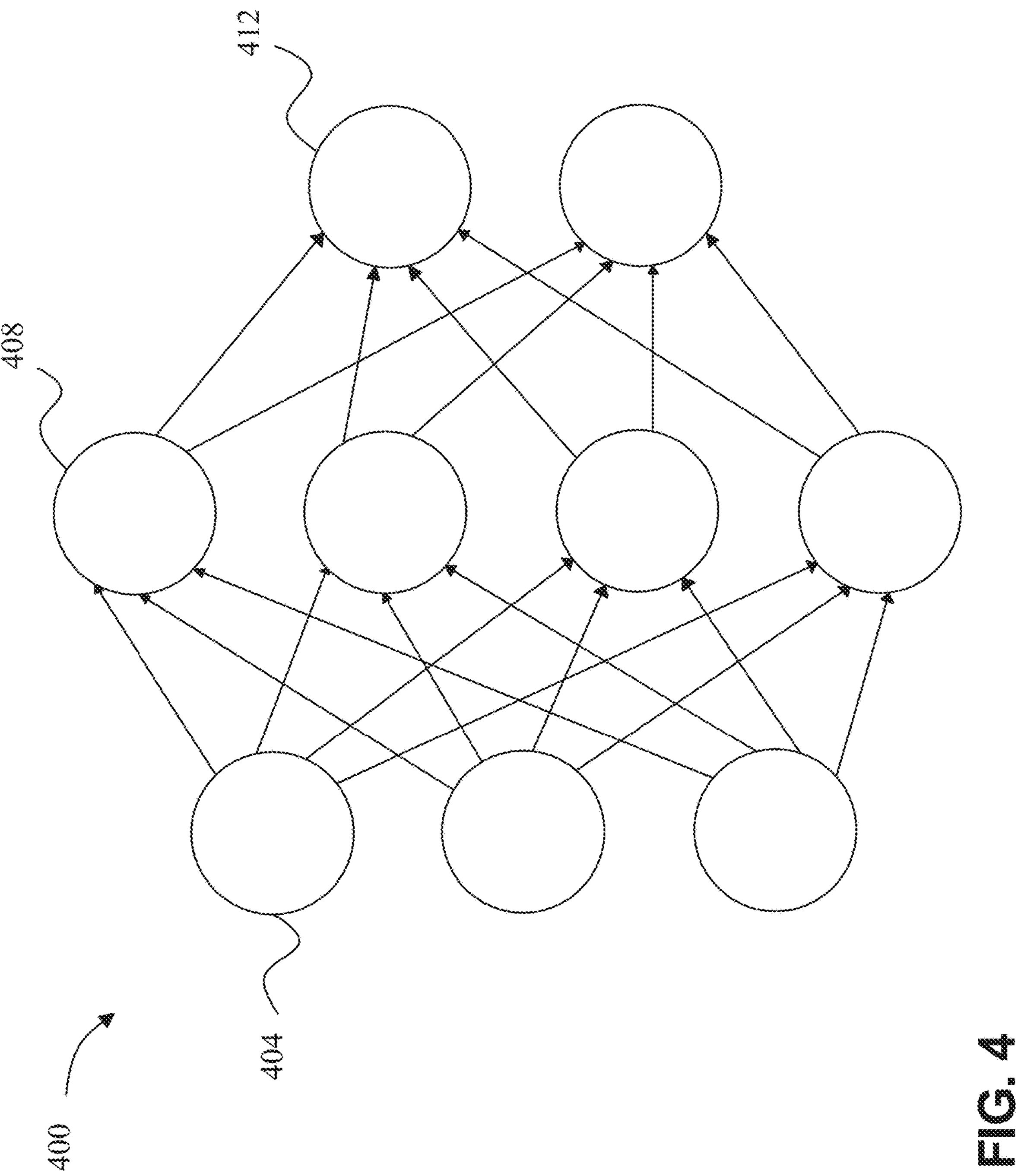
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
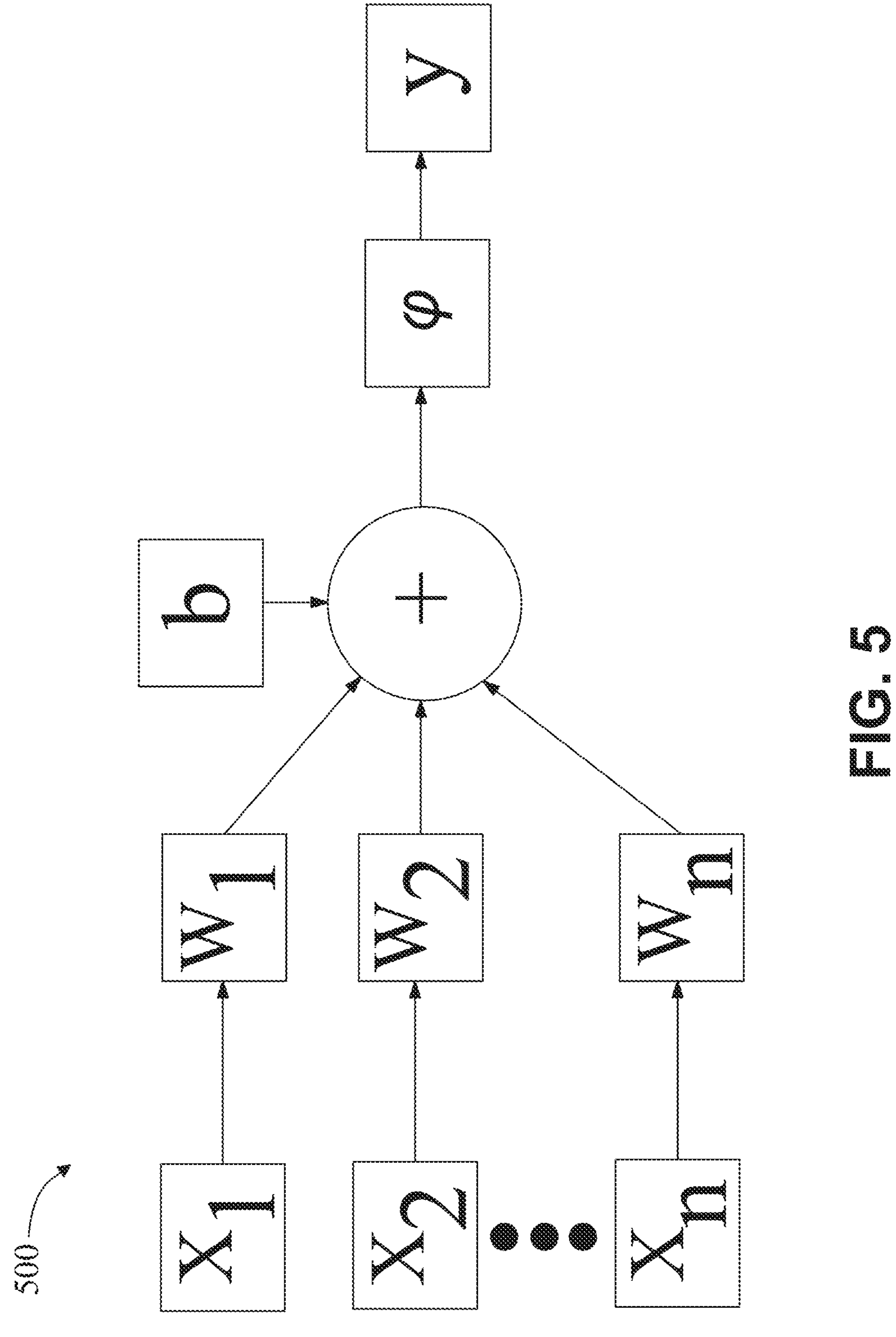
FIG. 5 is a diagram of an exemplary embodiment of a node of a neural network.

Referring now to FIG. 5, an exemplary embodiment of a node 500 of a neural network is illustrated. A node may include, without limitation a plurality of inputs x; that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0,x)$, a "leaky" and/or "parametric" rectified linear unit function such as $f(x)=\max(ax,x)$ for some a, an exponential linear units function such as $$f(x) = \begin{cases} x & \text{for } x \geq 0 \\ \alpha(e^x - 1) & \text{for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda\begin{cases} \alpha(e^x - 1) & \text{for } x < 0 \\ x & \text{for } x \geq 0 \end{cases}.$$

Fundamentally, there is no limit to the nature of functions of inputs x; that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is “excitatory,” indicating that it has strong influence on the one or more outputs y, for instance by the corresponding weight having a large numerical value, and/or a “inhibitory,” indicating it has a weak effect influence on the one more inputs y, for instance by the corresponding weight having a small numerical value. The values of weights $w_i$ may be determined by training a neural network using training data, which may be performed using any suitable process as described above.

Figure 6:
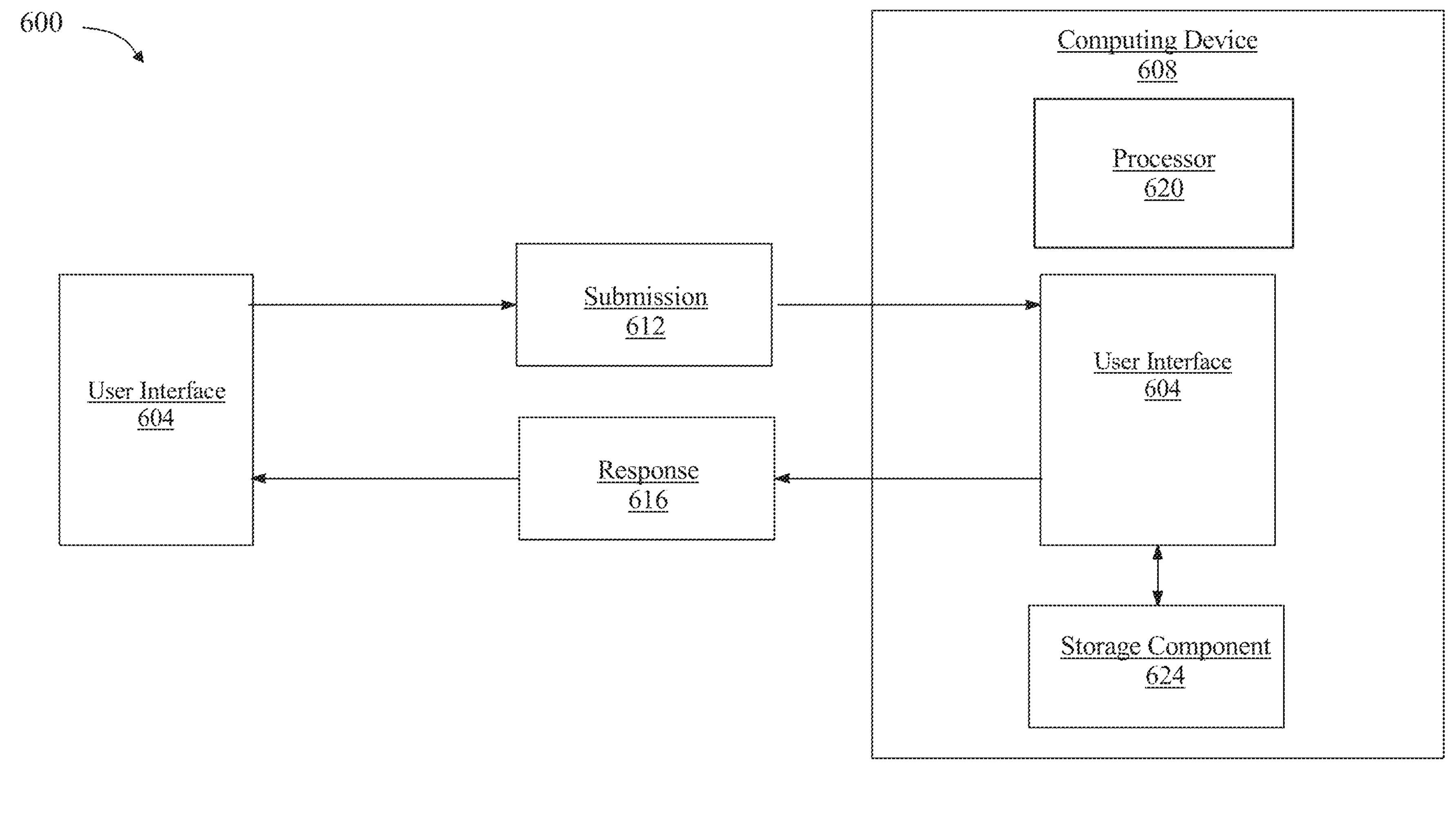
FIG. 6 is a block diagram of an exemplary chatbot.

Referring to FIG. 6, a chatbot system 600 is schematically illustrated. According to some embodiments, a user interface 604 may be communicative with a computing device 608 that is configured to operate a chatbot. In some cases, user interface 604 may be local to computing device 608. Alternatively or additionally, in some cases, user interface 604 may remote to computing device 608 and communicative with the computing device 608, by way of one or more networks, such as without limitation the internet. Alternatively or additionally, user interface 604 may communicate with user device using telephonic devices and networks, such as without limitation fax machines, short message service (SMS), or multimedia message service (MMS). Commonly, user interface 604 communicates with computing device 608 using text-based communication, for example without limitation using a character encoding protocol, such as American Standard for Information Interchange (ASCII). Typically, a user interface 604 conversationally interfaces a chatbot, by way of at least a submission 612, from the user interface 604 to the chatbot, and a response 616, from the chatbot to the user interface 604. In many cases, one or both of submission 612 and response 616 are text-based communication. Alternatively or additionally, in some cases, one or both of submission 612 and response 616 are audio-based communication.

Continuing in reference to FIG. 6, a submission 612 once received by computing device 608 operating a chatbot, may be processed by a processor 620. In some embodiments, processor 620 processes a submission 612 using one or more of keyword recognition, pattern matching, and natural language processing. In some embodiments, processor employs real-time learning with evolutionary algorithms. In some cases, processor 620 may retrieve a pre-prepared response from at least a storage component 624, based upon submission 612. Alternatively or additionally, in some embodiments, processor 620 communicates a response 616 without first receiving a submission 612, thereby initiating conversation. In some cases, processor 620 communicates an inquiry to user interface 604; and the processor is configured to process an answer to the inquiry in a following submission 612 from the user interface 604. In some cases, an answer to an inquiry present within a submission 612 from a user device 604 may be used by computing device 104 as an input to another function, for example without limitation at least a feature or at least a preference input.

Figure 7:
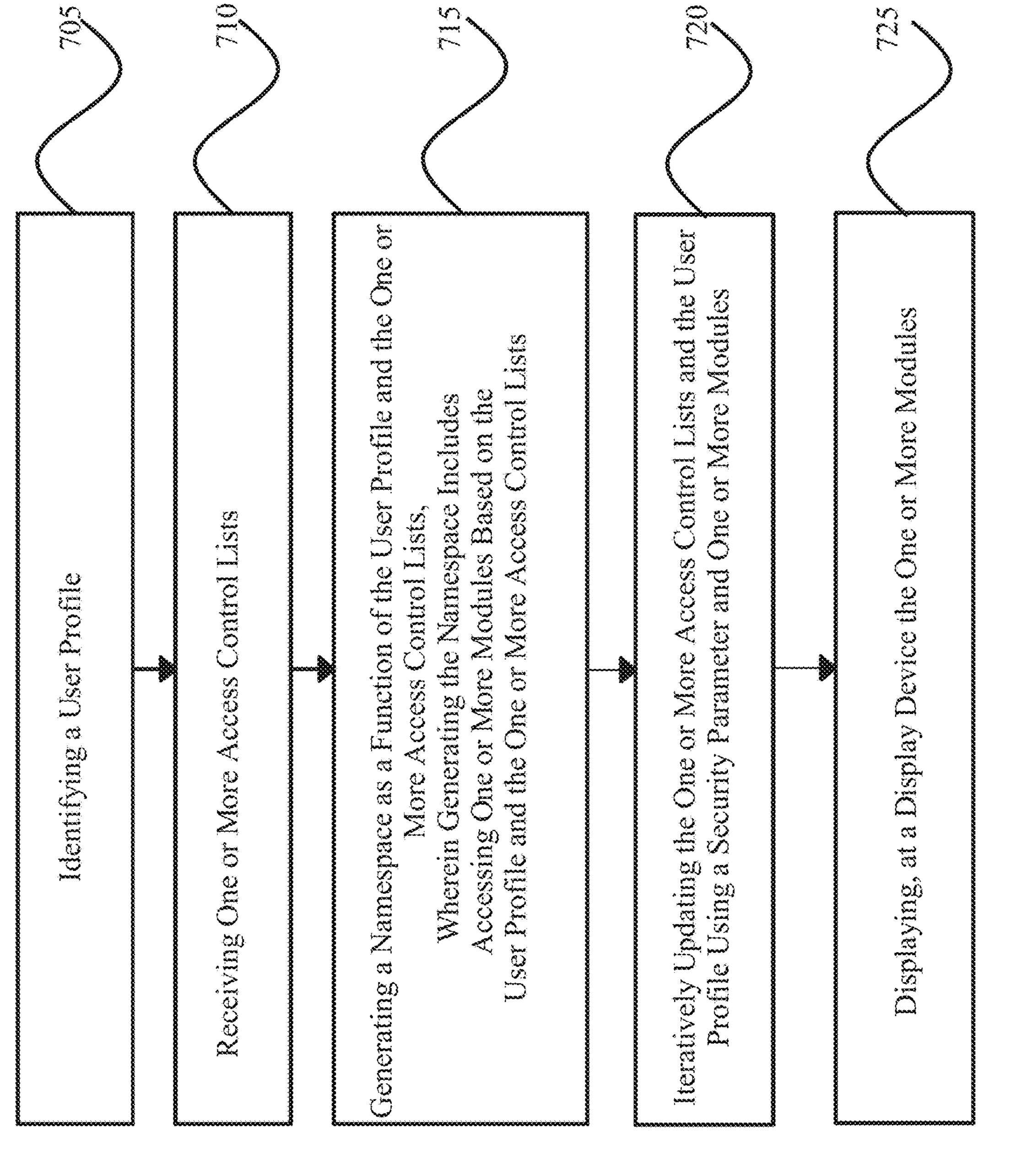
FIG. 7 is a flow diagram of an exemplary method for determining a prioritized array of associated datasets.

Now referring to FIG. 7, illustrated is a flow diagram of an exemplary method 700 for generating a namespace using a user profile. Method 700 for generating a namespace using a user profile may include a step 705 of identifying a user profile. Identifying a user profile may additionally include verifying the user profile using a verification module, wherein the verification module includes a machine-learning model. This may be implemented as described with reference to FIGS. 1-6. Method 700 for generating a namespace using a user profile may include a step 710 of receiving one or more access control lists. This may be implemented as described in reference to FIGS. 1-6. Method 700 for generating a namespace using a user profile may include a step 715 of generating a namespace as a function of the user profile and the one or more access control lists, wherein generating the namespace includes accessing one or more modules based on the user profile and the one or more access control lists. The one or more modules may be received from a database. This may be implemented as described in reference to FIGS. 1-6. Method 700 for generating a namespace using a user profile may include a step 720 of iteratively updating the one or more access control lists and the user profile using a security parameter and one or more user interactions. This may be implemented as described in reference to FIGS. 1-6.

With continued reference to FIG. 7, in an embodiment, method 700 for generating a namespace based on a user profile may further include a step 725 of displaying, at a display device, the one or more modules. Further, the display device may utilize a graphical user interface (GUI, wherein the GUI iteratively updates based on one or more user interactions, wherein the one or more user interactions include structured and interactive user inputs. In an embodiment, the GUI may include a plurality of event handlers. This may be implemented as described in reference to FIGS. 1-6.

Still referring to FIG. 7, in an embodiment, the one or more access control lists may be generated by a user profile analysis model. Further, the user profile analysis model may generate one or more access control lists using feature extraction and clustering algorithms. In an embodiment, the user profile analysis model may be trained using exemplary profiles associated with a user and exemplary security parameters correlated with exemplary one or more access control lists. In an exemplary embodiment, iteratively updating the GUI based on one or more user interactions may include one or more user interactions including a user submitting an assignment, wherein the user selects a course, navigates to an “assignments” section, and uploads a file for a specific assignment, and clicks “submit,” the at least a processor may validate the file type and size, then save the submission to a database, and the GUI may update the display device based on the user interaction, wherein the GUI updating the display device may include updating a course progress status. This may be implemented as described in reference to FIGS. 1-6.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
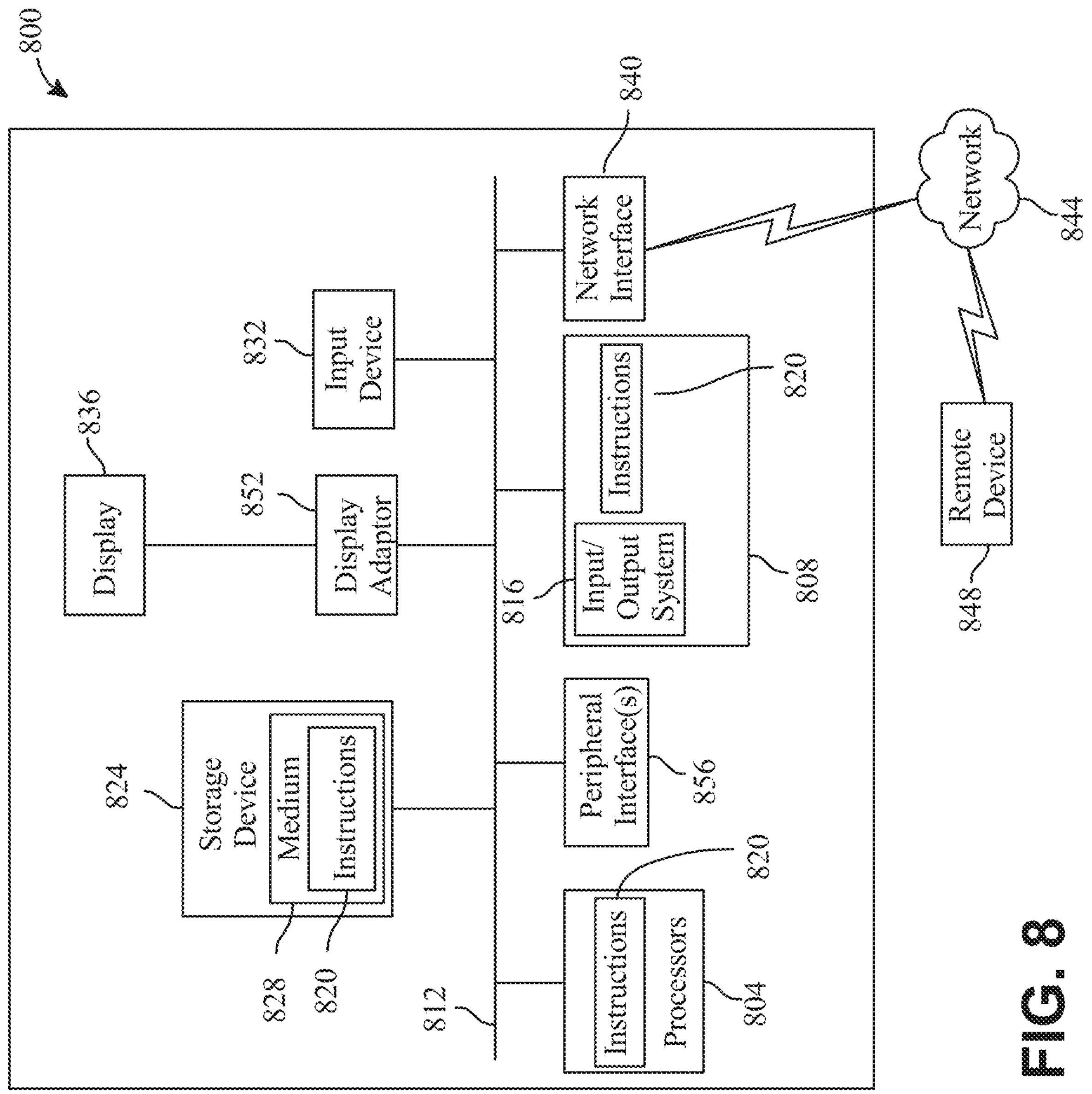
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for generating a namespace based on a user profile, the system comprising:

at least a processor; and a memory communicatively connected to the at least a processor, wherein the memory contains instructions configuring the at least a processor to:

retrieve the user profile stored in the memory;

iteratively update the user profile with behavioral data collection, by tracking user interactions across a plurality of online platforms, and implementing at least a clustering model to group and refine the user profile based on previously received user profiles stored in the memory using degree of similarity index values generated by the clustering model;

sanitize training data to eliminate noise, wherein the training data comprises exemplary user profiles and exemplary permissions correlated with exemplary access control lists, wherein sanitizing the training data further comprises reducing noise in the training data and accelerating convergence of a user profile analysis model, wherein sanitizing the training data comprises:

determining that at least one training data entry of the training data has a signal to noise ratio below a threshold value; and removing the at least one training data entry from the training data to create sanitized training data;

generate one or more access control lists using a user profile analysis model, wherein generating the one or more access control lists comprises:

training the user profile analysis model using the sanitized training data until the user profile analysis model satisfies a convergence test, wherein sanitizing of the training data accelerates convergence of the user profile analysis model; and generating the one or more access controls lists as a function of the user profile and at least one associated permission using the trained user profile analysis model;

generate the namespace as a function of the user profile and the one or more access control lists, wherein generating the namespace comprises accessing one or more modules based on the user profile and the one or more access control lists;

iteratively update the one or more access control lists and the user profile using a security parameter and one or more user interactions; and display, at a display device, the one or more modules.

2. The system of claim 1, wherein the memory contains instructions further configuring the at least a processor to generate a graphical user interface (GUI) and display the GUI at the display device, wherein the GUI is iteratively updated by the at least a processor based on one or more user interactions.

3. The system of claim 2, wherein the GUI comprises a plurality of event handlers.

4. The system of claim 2, wherein, iteratively updating the GUI based on one or more user interactions comprises:

one or more user interactions comprising a user submitting an assignment;

validating a file type and size;

saving the assignment to a database; and updating the display device based on the user interaction, wherein the GUI updating the display device comprises updating a course progress status.

5. The system of claim 1, wherein identifying the user profile comprises verifying the user profile using a verification module.

6. The system of claim 5, wherein the verification module comprises a verification machine-learning model.

7. The system of claim 1, wherein the one or more modules are received from a database.

8. The system of claim 1, wherein the memory contains instructions further configuring the at least a processor to generate, using the user profile analysis model, the one or more access control lists using feature extraction and clustering algorithms.

9. A method for generating a namespace based on a user profile, the method comprising:

retrieving, by at least a processor, the user profile stored in a memory;

iteratively updating, by the least a processor, the user profile with behavioral data collection, by tracking user interactions across a plurality of online platforms, and implementing at least a clustering model to group and refine the user profile based on previously received user profiles using degree of similarity index values generated by the clustering model;

sanitizing, by the at least a processor, training data to eliminate noise, wherein the training data comprises exemplary user profiles and exemplary permissions correlated with exemplary access control lists, wherein sanitizing the training data further comprises reducing noise in the training data and accelerating convergence of a user profile analysis model, wherein sanitizing the training data comprises:

determining that at least one training data entry of the training data has a signal to noise ratio below a threshold value; and removing the at least one training data entry from the training data to create sanitized training data;

generating, by the at least a processor, one or more access control lists using a user profile analysis model, wherein generating the one or more access control lists comprises:

training the user profile analysis model using the sanitized training data until the user profile analysis model satisfies a convergence test, wherein sanitizing of the training data accelerates convergence of the user profile analysis model; and generating the one or more access controls lists as a function of the user profile and at least one associated permission using the trained user profile analysis model;

generating, by the at least a processor, the namespace as a function of the user profile and the one or more access control lists, wherein generating the namespace comprises: accessing one or more modules based on the user profile and the one or more access control lists;

iteratively update, by the at least a processor, the one or more access control lists and the user profile using a security parameter and one or more user interactions; and displaying, at a display device, the one or more modules.

10. The method of claim 9, wherein the method further comprises generating, by the at least a processor, a graphical user interface (GUI) and displaying the GUI at the display device, wherein the GUI is iteratively updated by the at least a processor based on one or more user interactions.

11. The method of claim 10, wherein the GUI comprises a plurality of event handlers.

12. The method of claim 10, wherein, iteratively updating the GUI based on one or more user interactions comprises:

one or more user interactions comprising a user submitting an assignment;

validating a file type and size;

saving the assignment to a database; and updating the display device based on the user interaction, wherein the GUI updating the display device comprises updating a course progress status.

13. The method of claim 9, wherein identifying the user profile comprises verifying the user profile using a verification module.

14. The method of claim 13, wherein the verification module comprises a verification machine-learning model.

15. The method of claim 9, wherein the one or more modules are received from a database.

16. The method of claim 9, wherein the method further comprises generating, using the user profile analysis model, the one or more access control lists using feature extraction and clustering algorithms.

* * * * *